United States Patent Office 3,580,900
Patented May 25, 1971

3,580,900
WATER-SOLUBLE QUATERNARY AMINE CONTAINING MONOAZO DYESTUFFS
Eberhard Mundlos, Frankfurt am Main, Reinhard Mohr, Offenbach am Main, Gunther Trapp, Frankfurt am Main, and Kurt Hohmann, Offenbach am Main, Germany, assignors to Farbwerke Hoechst Aktiengesellschaft vormals Meister Lucius & Brüning, Frankfurt am Main, Germany
No Drawing. Filed Oct. 1, 1968, Ser. No. 764,304
Claims priority, application Germany, Oct. 21, 1967,
P 16 44 230.1
Int. Cl. C07c 107/06; C09b 45/22, 29/01
U.S. Cl. 260—149                                   6 Claims

ABSTRACT OF THE DISCLOSURE

Water-soluble basic monoazo dyestuffs which are suitable for the dyeing or printing of textile fibrous materials consisting of native or regenerative cellulose, polyamides, polyesters, polyacrylonitrile or polyvinylidene cyanide.

---

The present invention provides basic azo dyestuffs and a process for preparing them.

We have found that basic azo dyestuffs which are free from sulfonic acid and carboxylic acid groups and which corresponding to the general Formula I

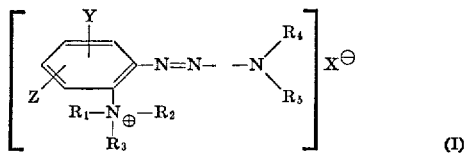

(I)

in which Y represents hydrogen or halogen, alkyl, alkoxy, trifluoromethyl, nitro, alkyl-sulfone, aryl-sulfone, cyano, or a carboxylic acid ester group, a sulfonic acid amide group which may be substituted, a carboxylic acid amide group which may be substituted, or acyl group, Z represents hydrogen, a non-water-solubilizing substituent, $R_4$ represents hydrogen, an alkyl or aryl radical which may be substituted, a cycloalkyl or an aralkyl radical, $R_5$ represents hydrogen, an alkyl radical which may be substituted, a cycloalkyl or an aralkyl radical, or $R_4$ and $R_5$ together with the nitrogen atom represent a heterocyclic group, A represents a phenylene or naphthylene radical which may be substituted, $R_1$, $R_2$ and $R_3$ represent lower alkyl groups which may be substituted, and $X^\ominus$ represents an anion, can be prepared and they have valuable properties. The novel dyestuffs may be obtained in such a manner that (a) the diazonium compound of a quaternary amine of the general Formula II

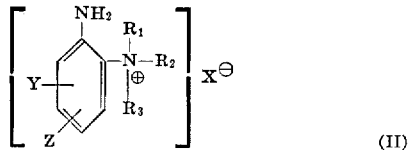

(II)

in which Y, Z, $R_1$, $R_2$, $R_3$ and $X^\ominus$ have the meaning given above, is coupled with a coupling component of the Formula III

(III)

in which A, $R_4$ and $R_5$ have the meaning given above, or (b) an azo dyestuff to the general Formula IV

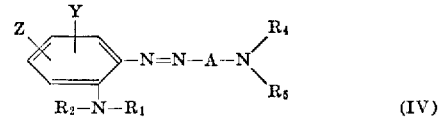

(IV)

in which Y, X, $R_1$, $R_2$, $R_4$, $R_5$ and A have the meanings given above, is reacted with a quaternating agent which introduces into the dyestuff molecule the radical $R_3$ and the anion $X^\ominus$.

The method (a) is especially suitable and generally applicable. The quaternary amines of the Formula II used in this method can be obtained by quaternating an amine of the Formula V

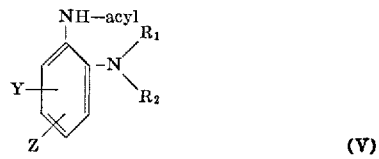

(V)

with an agent which introduces into the dyestuff molecule the radical $R_3$ and the anion $X^\ominus$, and subsequently splitting off the acyl group according to the usual methods, for example by means of inorganic acids.

As quaternating agents, there may be used alkyl halides, aralkyl halides, halogeno-acetamides, β-halogeno-propionitriles, halogeno-hydrins, alkyl esters of sulfuric acid or alkyl esters of organic sulfonic acids. Suitable quaternating agents are, for example, methyl chloride, methyl bromide or methyl iodide, ethyl bromide or ethyl iodide, propyl bromide or propyl iodide, benzyl chloride, dimethyl sulfate, diethyl sulfate, benzene-sulfonic acid methyl ester or p-toluene-sulfonic acid methyl-, ethyl-, propyl, or butyl ester. Quaternization is carried out in water or in an inert organic solvent, for example, in a hydrocarbon, chlorohydrocarbon or nitro-hydrocarbon, for example, benzene, toluene, xylene, tetrachloroethane, chloroform, carbon tetrachloride, mono- or dichlorobenzene or nitrobenzene, in an acid amide or acid anhydride, for example, dimethylformamide, N-methyl-acetamide, or acetic acid anhydride, in dimethyl sulfoxide or in a ketone, for example, acetone or methylethylketone. Instead of an organic solvent, there may also be used an excess of the quaternating agent. Quaternization may be effected at an elevated temperature, if desired under pressure. The conditions which are the most favorable in each case can easily be determined in a preliminary test.

Suitable compounds fo the Formula V are 1-acylamino-2-N,N-dialkylamino-benzenes which may carry in the benzene nucleus no further substituents or the substituents Y and Z; Y representing a halogen atom, such as chlorine or bromine, an alkyl, alkoxy, trifluoromethyl, nitro, alkyl-sulfone, aryl-sulfone, cyano, or a carboxylic acid ester group, or a sulfonic acid amide group which may be substituted, a carboxylic acid amide group which may be substituted or an acyl group and Z representing a non-water-solubilizing substituent such as a halogen atom, and alkyl, alkoxy, alkyl-sulfone, aryl-sulfone, sulfamyl, carbamyl, aryl, aryloxy, acylamino, carbalkoxy, trifluoromethyl, cyano or acyl group.

Diazotization of the amines of the Formula II is effected according to methods known per se, for example, by means of hydrochloric acid and sodium nitrite.

Coupling with the coupling components of the Formula III is effected by a method known per se, for example, in a neutral or acid medium, if desired or necessary in the presence of a buffer compound or a compound which accelerates coupling, such, for example, as pyridine.

As coupling components of the Formula III there may be used according to the invention benzene or naphthalene compounds which couple in the o- or p-position to a primary, secondary or tertiary amino group. Suitable primary amines are, for example, aniline, toluidines, xylidines, anisidines, phenylene diamines, toluylene diamines, amino cresol ethers, alkoxy anilines, chloroanilines, 3-acylamino anilines, dialkoxy anilines or naphthyl amines. As secondary or tertiary amines there may be used compounds which contain as substituents in the amino group, lower alkyl radicals, for example, methyl, ethyl, propyl or butyl radicals, aralkyl, cycloalkyl or aryl radicals which may contain one or more further substituents, for exampe, halogen atoms, hydroxy, cyano, carbalkoxy, carbamyl, acyloxy, phenyl, alkoxy, phenoxy or dialkylamino groups. In the tertiary amines, $R_4$ and $R_5$ may form with each other or with a further nitrogen atom or an oxygen atom, hydrogenated heterocycles, for example, the piperidine, morpholine or piperazine rings. The benzene or the naphthalene radical A may contain one or more other substituents, for example, halogen atoms, alkyl, alkoxy, carbalkoxy, alkyl-sulfone, cyano or acylamino groups.

The monoazo dyestuffs of the Formula IV used in the method (b) can be prepared by methods known per se, for example by coupling the diazotized amine of the Formula VI

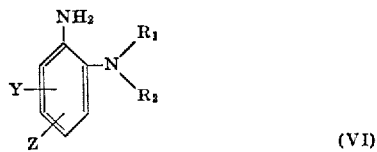

(VI)

with a coupling component of the Formula III or by alkaline condensation of an amine of the Formula VI with the corresponding p-nitroso compound of a tertiary amine of the benzene or the naphthalene series corresponding to Formula III.

The dyestuffs obtained according to the present invention contain as the anion $X^\ominus$ preferably the radical of a strong acid, for example, that of sulfuric acid or of its semi-esters, of an arylsulfonic acid or of a hydrohalic acid. These anions, introduced according to the process of the present invention can also be replaced by anions of other acids, for example, those of phosphoric acid, acetic acid, oxalic acid, lactic acid or tartaric acid. Furthermore, the dyestuffs can be obtained in form of their double salts with zinc or cadmium halides.

The new dyestuffs are suitable for the dyeing or printing of tanned natural or regenerated cellulose fibres, silk, leather or synthetic fibers, for example, acetate rayon, polyamide fibers or polyester fibers modified by acids, especially fibers containing polyacrylonitrile or polyvinylidene-cyanide. The dyeings produced on these fibers are generally very clear and very intense and generally have a good fastness to light and to wetting.

The following examples illustrate the invention but they are not intended to limit it thereto, the parts being by weight unless mentioned otherwise.

EXAMPLE 1

A mixture of 3.75 parts of 1-amino - 2 - acetylaminobenzene, 25 parts of water and 2 parts of magnesium oxide was combined while stirring at 50–60° C. with 12.6 parts of dimethyl sulfate, the whole was stirred for 1 hour at this temperature, then cooled and filtered. 9 parts of a sulfuric acid of 95% strength were added to the filtrate, the mixture was heated at the boil for 1 hour and the solution of 2-amino-phenyl-1-trimethylammonium methylsulfate thus obtained was cooled to 0–5° C. Subsequently, diazotization was effected with 5 parts by volume of 5 N-sodium nitrite solution, the solution was stirred for 30 minutes, the excess of nitrite was destroyed by means of amidosulfonic acid and the diazo solution was clarified by means of kieselguhr. 3.9 parts of 3 - chloro-N,N-dimethylaniline were added to the diazo solution thus obtained and the whole was stirred for 2 hours at room temperature. The product was salted out with sodium sulfate the precipitated dyestuff of the formula

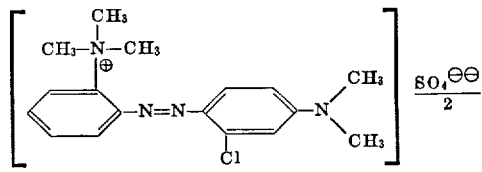

was suction-filtered, washed with a sodium sulfate solution of 14% strength and dried. There were obtained 8 parts of a dyestuff which was easily soluble in water and dilute acetic acid while giving a yellow orange color.

4 grams of the dyestuff were stirred with 12 cc. of a 50%-acetic acid and the mixture was dissolved by pouring 200 cc. of hot water onto it. The stock solution was introduced into a dyeing apparatus for cross-wound bobbins which had been previously charged with 6 liters of water, 5 grams of crystallized sodium acetate and 50 grams of calcined sodium sulfate. Then 400 grams of polyacrylonitrile yarn in the form of a cross-wound bobbin were introduced and dyed under alternating liquor circulation while slowly raising the temperature. From 85° C. upwards the temperature of the dyebath was only slowly raised to 106–108° C. and then maintained for 45 minutes. Thereafter, the dyebath was clearly exhausted; it was cooled to about 70° C. and the dyeing was then treated in usual manner. A clear gold-yellow dyeing having good fastness to light and to wet processing was obtained.

When in the above example, instead of 3-chloro-N, N-dimethylaniline, the corresponding amount of 3-chloro-N-methyl-N-β-cyanoethyl-aniline or 3 - chloro-N-ethyl-N-β-cyanoethyl-aniline was used and the procedure described was followed, the dyestuffs of the formula

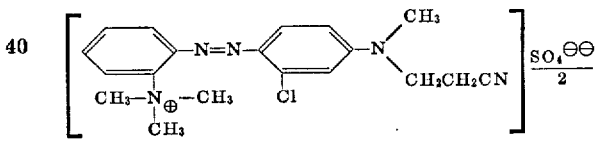

or of the formula

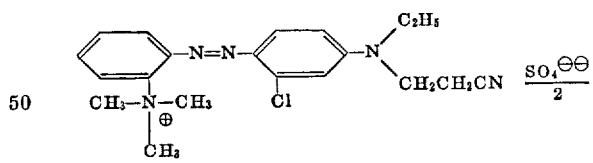

were obtained which dyed polyacryolnitrile fibers from an acetic acid bath orange tints having good fastness to light and wet processing.

EXAMPLE 2

A mixture of 4.6 parts of 1-amino-2-acetylamino-5-chlorobenzene, 25 parts of water and 2 parts of magnesium oxide was combined while stirring at 50–60° C. with 12.6 parts of dimethyl sulfate, the mixture was stirred for 1 hour at this temperature, cooled and filtered. 20 parts by volume of concentrated hydrochloric acid were added to the filtrate, the mixture was heated at the boil for 1 hour and the solution of 5-chloro-2-aminophenyl-1 - trimethylammonium methylsulfate thus obtained was cooled to 0–5° C. Diazotization was effected with 5 parts by volume of a 5 N-sodium nitrate solution, the solution was stirred for 30 minutes, the excess of nitrite was destroyed by means of amidosulfonic acid and the diazo solution was clarified by means of kieselguhr. 4.7 parts of 3-methyl-N-ethyl-N-β-cyanoethyl-aniline were added to the diazo solution thus obtained, the whole was stirred for 2 hours at room temperature and by adding 5 parts by volume of zinc chloride lye having a strength of 70% the zinc chloride double salt of the dyestuff of the formula

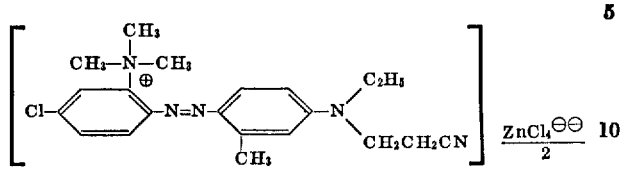

was separated. It was suction-filtered, washed with a 10% sodium chloride solution and dried. 9 parts of a dyestuff were obtained which was easily soluble in water and dilute acetic acid while giving a yellow-orange color.

1 gram of the dyestuff was stirred with 2.5 grams of a 50%-acetic acid and the mixture was dissolved in 6 liters of water. 1 gram of crystallized sodium acetate and 10 grams of calcined sodium sulfate were also added to the dyebath. Subsequently, 100 grams of polyacrylonitrile staple fiber yarn that had been previously washed were introduced into the dyebath having a temperature of 60° C., the temperature was slowly raised to 100° C. and dyeing was effected within 1 hour at boiling temperature. The dyebath was then allowed to cool slowly to 70° C., the goods were rinsed and dried. A clear orange dyeing was obtained which had a good fastness to light and wet processing.

The following table indicates other dyestuffs which can be obtained according to the present invention, and the tints of the dyeings produced with them on polyacrylonitrile fibers.

Dyestuffs the cation of which corresponds to the general formula

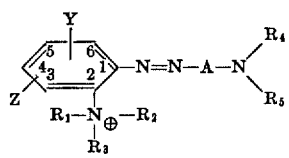

We claim:
1. The water-soluble basic monoazo dyestuff of the formula

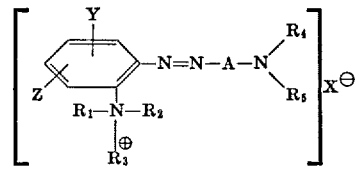

in which Y represents hydrogen, chlorine, bromine, lower alkyl, lower alkoxy, trifluoromethyl, lower alkyl sulfonyl, sulfamly or carbamyl, Z represents hydrogen, chlorine, bromine or lower alkyl, $R_1$, $R_2$ and $R_3$ represent lower alkyl, $R_4$ and $R_5$ represent hydrogen, lower alkyl, cyano-lower alkyl, hydroxy-lower alkyl, lower alkoxy-lower alkyl, dimethyl-amino-lower alkyl, carbamyl-lower alkyl, carb-lower alkoxy-lower alkyl or benzyl, A represents phenylene, chlorophenylene, lower alkyl-phenylene, acetylamino-phenylene, carb-lower alkoxy-phenylene or naphthylene, $X^\ominus$ represents an anion.

2. The water-soluble basic monoazo dyestuff of the formula

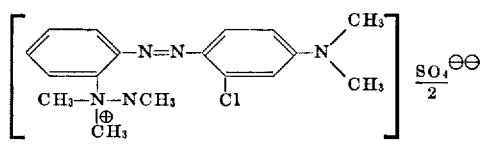

3. The water-soluble basic monoazo dyestuff of the formula

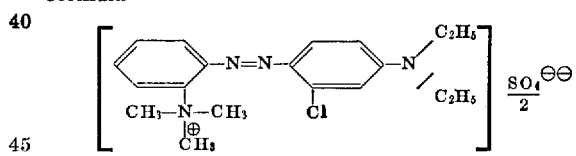

| $R_1$ | $R_2$ | $R_3$ | Y | Z | A-N(R_4)(R_5) | Tint |
|---|---|---|---|---|---|---|
| Methyl | Methyl | Methyl | Hydrogen | Hydrogen | N,N-dimethylaniline | Orange. |
| Do | do | do | do | do | do | Do. |
| Do | do | do | do | do | N-ethyl-N-β-cyanoethylaniline | Do. |
| Do | do | do | do | do | 3-chloro-N,N-diethylaniline | Do. |
| Do | do | do | do | do | N-ethyl-N-β-dimethylaminoethylaniline | Do. |
| Do | do | do | do | do | 1-benzylaminonapthalene | Red. |
| Do | do | do | do | do | 2-chloro-N-β-hydroxyethylaniline | Yellow. |
| Do | do | do | do | do | 3-carbethoxy-N,N-diethylaniline | Orange. |
| Do | do | do | do | do | 3-chloro-N,N-di-β-hydroxyethylaniline | Do. |
| Do | do | do | do | do | 3-methyl-N-ethyl-N-β-hydroxyethylaniline | Do. |
| Do | do | do | do | do | N,N-dibutylaniline | Do. |
| Do | do | do | do | do | N-butyl-N-β-cyanoethylaniline | Do. |
| Do | do | do | do | do | N-(3-methylphenyl)-morpholine | Do. |
| Do | do | do | do | do | N-2-chlorophenyl)-amino acetic acid ethyl ester | Do. |
| Do | do | do | do | do | 2-chloro-N-ethylaniline | Yellow. |
| Do | do | do | do | do | 2-chloro-N-β-cyanoethylaniline | Do. |
| Do | do | do | do | do | 3-methyl-N,N-dimethylaniline | Orange. |
| Do | do | do | 4-chloro | do | 3-methyl-N-ethyl-N-β-hydroxyethylaniline | Do. |
| Do | do | do | do | do | 3-chloro-N,N-diethylaniline | Do. |
| Do | do | do | do | do | N-ethyl-N-β-cyanoethylaniline | Do. |
| Do | do | do | do | do | N-ethyl-N-β-carbamyl-ethylaniline | Do. |
| Do | do | do | 4-methyl | do | N,N-diethylaniline | Do. |
| Do | do | do | do | do | N-ethyl-N-β-methoxy-ethylaniline | Do. |
| Do | do | do | 4-chloro | 6-chloro | 3-chloro-N,N-diethylaniline | Do. |
| Ethyl | Ethyl | do | Hydrogen | Hydrogen | do | Do. |
| Methyl | Methyl | do | 5-methyl | do | 3-chloro-N,N-dimethylaniline | Do. |
| Do | do | do | 5-methoxy | do | 3-chloro-N,N-diethylaniline | Do. |
| Do | do | do | 5-carbamyl | do | do | Do. |
| Do | do | do | 5-sulfamyl | do | 2-chloro-N-β-cyanoethylaniline | Yellow. |
| Do | do | do | 5-methyl | 6-methyl | do | Do. |
| Do | do | do | 5-trifluoromethyl | Hydrogen | 3-chloro-N,N-dimethylaniline | Orange. |
| Do | do | do | 5-methylsulfonyl | do | do | Do. |
| Do | do | do | 5-trifluoromethyl | do | 3-chloro-N-ethyl-N-β-cyanoethylaniline | Do. |
| Do | do | do | Hydrogen | do | 3-acetylamino-N,N-dimethylaniline | Do. |

4. The water-soluble basic monoazo dyestuff of the formula
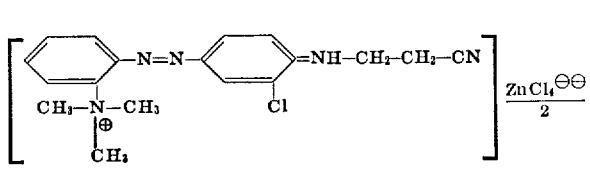
5. The water-soluble basic monoazo dyestuff of the formula
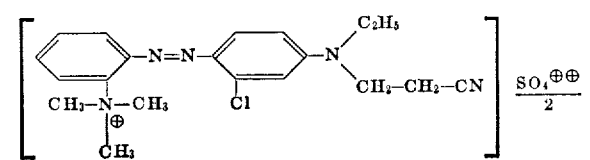
6. The water-soluble basic monoazo dyestuff of the formula
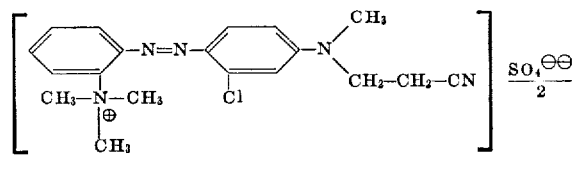
References Cited
UNITED STATES PATENTS
3,454,552   7/1969   Yamaya et al. _____ 260—205
CHARLES B. PARKER, Primary Examiner
C. F. WARREN, Assistant Examiner
U.S. Cl. X.R.
8—13, 41, 50, 51; 260—146, 151, 152, 196, 198, 200, 202, 205, 206, 207, 207.1, 207.5